(12) United States Patent
Choi

(10) Patent No.: US 10,956,895 B2
(45) Date of Patent: Mar. 23, 2021

(54) PAYMENT TRANSACTION METHOD AND ELECTRONIC DEVICE THEREFOR

(71) Applicant: SAMSUNG ELECTRONICS CO., LTD., Suwon-si (KR)

(72) Inventor: Junwon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 609 days.

(21) Appl. No.: 15/460,485

(22) Filed: Mar. 16, 2017

(65) Prior Publication Data
US 2017/0270523 A1    Sep. 21, 2017

(30) Foreign Application Priority Data
Mar. 18, 2016    (KR) .................. 10-2016-0032646

(51) Int. Cl.
G06Q 20/32    (2012.01)
G06Q 30/06    (2012.01)
G06Q 20/40    (2012.01)

(52) U.S. Cl.
CPC ....... *G06Q 20/3278* (2013.01); *G06Q 20/405* (2013.01); *G06Q 20/40145* (2013.01); *G06Q 30/0613* (2013.01)

(58) Field of Classification Search
None
See application file for complete search history.

(56) References Cited

U.S. PATENT DOCUMENTS

| 8,533,123 | B2 | 9/2013 | Hart |
| 8,814,046 | B1 | 8/2014 | Wallner |
| 2014/0246490 | A1* | 9/2014 | Graylin ............. G06Q 20/3674 235/379 |
| 2015/0363771 | A1* | 12/2015 | Graylin ............. G06Q 20/3825 705/65 |

(Continued)

FOREIGN PATENT DOCUMENTS

| CN | 102404025 A | 4/2012 |
| CN | 102521744 A | 6/2012 |

(Continued)

OTHER PUBLICATIONS

"Get Started with LoopPay," Mar. 15, 2015. Retrieved from the Internet on May 20, 2019 via Archive.org.*

(Continued)

*Primary Examiner* — Jamie R Kucab
(74) *Attorney, Agent, or Firm* — Nixon & Vanderhye P.C.

(57) ABSTRACT

A payment transaction method and device are provided. The electronic device includes a first communication module comprising first communication circuitry configured to transmit and receive first payment information, a second communication module comprising second communication circuitry configured to transmit second payment information, and a processor which is functionally connected to the first and second communication modules, wherein the processor is configured to receive a payment request signal, to select one of the first and second communication modules based on the received payment request signal, and to transmit payment information corresponding to the selected communication module to an external device.

20 Claims, 7 Drawing Sheets

(56) References Cited

U.S. PATENT DOCUMENTS

2017/0193475 A1\*  7/2017  Mercille ............ G06Q 20/3224
2019/0378106 A1\* 12/2019  Bonestell ............ G06Q 20/382
2019/0378182 A1\* 12/2019  Weinflash ............ G06Q 20/102

FOREIGN PATENT DOCUMENTS

| CN | 203825664 U    | 9/2014  |
|----|----------------|---------|
| CN | 105321067 A    | 2/2016  |
| KR | 10-2015-0112721| 10/2015 |
| KR | 10-2015-0128633| 11/2015 |
| WO | 2014/133863    | 9/2014  |
| WO | 2015/123559    | 8/2015  |

OTHER PUBLICATIONS

Extended Search Report dated Jun. 30, 2017 in counterpart EuropeanPatent Application No. 17161453.0.

Anonymous: "Will Graylin Shares Why Samsung Pay Got Delayed," PYMNTS.com, Jun. 6, 2015, XP055384566, retrieved from the Internet: URL:http://www.pymnts.com/in-depth/2015/why-samsung-pay-got-delayed/, retrieved Jun. 23, 2017.

Anonymous: "LoopPay: Tiny Metal Coil Revolutionize Mobile Payments—Business Insider", Jan. 6, 2015 XP055384586, retrieved from the Internet: URL:http://www.businessinsider.com/looppay-tiny-metal-coil-revolutionize-mobile-payments-2015-1?international_true&r_US&IR=T, retrieved Jun. 23, 2017.

Chinese Office Action dated Feb. 3, 2021 for CN Application No. 201710162201.5.

\* cited by examiner

PAYMENT TRANSACTION METHOD AND ELECTRONIC DEVICE THEREFOR

CROSS-REFERENCE TO RELATED APPLICATION

This application is based on and claims priority under 35 U.S.C. § 119 to a Korean patent application filed on Mar. 18, 2016 in the Korean Intellectual Property Office and assigned Serial number 10-2016-0032646, the disclosure of which is incorporated by reference herein in its entirety.

TECHNICAL FIELD

The present disclosure relates generally to a payment transaction method and an electronic device therefore.

BACKGROUND

With the advance of technology, electronic devices have become essential for daily life. Such electronic devices have evolved to multimedia communication tools capable of supporting various data communication and supplementary services as well as legacy voice communication services. For example, an electronic device may be configured to receive broadcast or multicast signals to play videos and television programs. An electronic device may transmit data to another electronic device through a wired/wireless network (e.g., Bluetooth and $3^{rd}$ Generation (3G) networks).

An electronic device may be provided with a banking application capable of allowing a user to deposit and withdraw money. For example, the user may deposit and withdraw money to and from a user's bank account using user authentication information stored in the memory of the electronic device.

SUMMARY

The present disclosure provides a payment transaction method and device that is capable of transmitting payment information by means of at least one communication module for mobile payment services.

In accordance with an example aspect of the present disclosure, an electronic device is provided. The electronic device includes a first communication module comprising communication circuitry configured to transmit and receive first payment information, a second communication module comprising communication circuitry configured to transmit second payment information, and a processor which is functionally connected to the first and second communication modules, wherein the processor is configured to receive a payment request signal, to select one of the first and second communication modules, and to transmit payment information corresponding to the selected communication module to an external device.

In accordance with another example aspect of the present disclosure, a payment transaction method of an electronic device is provided. The payment transaction method includes receiving a payment request signal, selecting one of a first communication module and a second communication module based on the received signal, and transmitting payment information corresponding to the selected communication module to an external device.

BRIEF DESCRIPTION OF THE DRAWINGS

These and other aspects, features and attendant advantages of the present disclosure will be more easily understood and readily appreciated from the following detailed description, taken in conjunction with the accompanying drawings, in which like reference numerals refer to like elements, and wherein.

DETAILED DESCRIPTION

Figure 1:
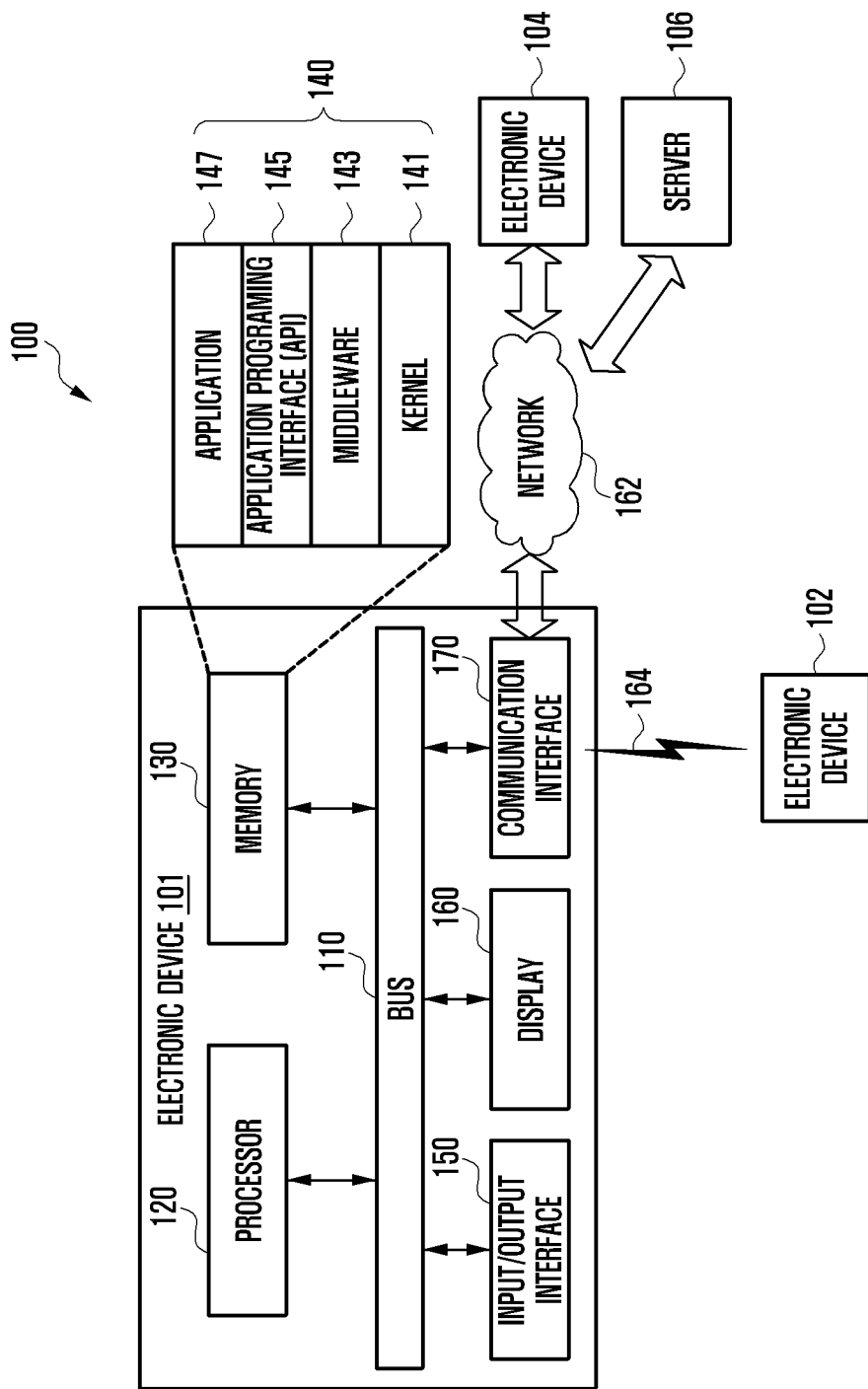
FIG. 1 is a diagram illustrating an example network environment including an electronic device according to various example embodiments of the present disclosure.

Hereinafter, various example embodiments of the present disclosure is described with reference to the accompanying drawings. Although specific embodiments are illustrated in the drawings and related detailed descriptions are discussed in the present disclosure, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

In various embodiments of the present disclosure, the terms such as "include", "have", "may include" or "may have" may be understood to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "(operatively or communicatively) coupled to" or "connected to" another component, the component may be directly coupled or connected to another component or a new component may exist between the component and another component. On the other hand, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor (e.g., an embedded processor) or a generic-purpose processor (e.g., CPU or application processor) that may execute one or more software programs stored in a memory device to perform corresponding functions.

An electronic device according to various example embodiments of the present disclosure may be a device including an antenna. For example, the electronic device may be one or more of the following: a smart phone, a tablet Personal Computer (PC), a mobile phone, a video phone, an e-book reader, a desktop PC, a laptop PC, a netbook computer, a Personal Digital Assistant (PDA), Portable Multimedia Player (PMP), MP3 player, a mobile medical application, a camera, and a wearable device (for example, a Head-Mounted-Device (HMD), such as electronic glasses, electronic clothes, an electronic bracelet, an electronic necklace, an electronic appcessary, an electronic tattoo, and a smart watch), or the like, but is not limited thereto.

According to some embodiments, the electronic device may be a smart home appliance having an antenna. The smart home appliance may include at least one of the following: a Television (TV), a Digital Video Disk (DVD) player, an audio player, an air conditioner, a cleaner, an oven, a microwave oven, a washing machine, an air purifier, a set-top box, a TV box (for example, Samsung HomeSync™, Apple TV™, or Google TV™), game consoles, an electronic dictionary, an electronic key, a camcorder, and an electronic frame, or the like, but is not limited thereto.

According to some embodiments, the electronic device may include at least one of the following: various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops, or the like, but is not limited thereto.

According to some embodiments, the electronic device may include at least one of the following: furniture or a part of a building/structure, an electronic board, an electronic signature receiving device, a projector, and various types of measuring devices (for example, a water meter, an electricity meter, a gas meter, a radio wave meter and the like), or the like, which are equipped with an antenna, but are not limited thereto. The electronic device according to various embodiments of the present disclosure may also be a combination of the devices listed above. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments will be discussed with reference to the accompanying drawings. The term se skilled in the art that the electronic device according to various embodiments of the present meter and the e (e.g., an artificial intelligence electronic device) using an electronic device.

FIG. 1 is a diagram illustrating an example network environment 100 including an electronic device 101 according to various example embodiments of the present disclosure.

The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to some embodiments, at least one of the above described components may be omitted from the electronic device 101 or another component may be further included in the electronic device 101.

The bus 110 may be a circuit connecting the above described components 120, 130, and 150~170 and transmitting communications (e.g., control messages and/or data) between the above described components.

The processor 120 may include various processing circuitry, such as, for example, and without limitation, one or more of the following: a dedicated processor, a central processing unit (CPU), an application processor (AP), and a communication processor (CP). The processor 120 is capable of controlling at least one of other components of the electronic device 101 and/or processing data or operations related to communication.

The memory 130 is capable of including volatile memory and/or non-volatile memory. The memory 130 is capable of storing data or commands related to at least one of other components of the electronic device 101. According to an embodiment, the memory 130 is capable of storing software and/or a program module 140. For example, the program module 140 is capable of including a kernel 141, middleware 143, application programming interface (API) 145, application programs (or applications) 147, etc. The kernel 141, middleware 143 or at least part of the API 145 may be called an operating system (OS).

The kernel 141 is capable of controlling or managing system resources (e.g., the bus 110, processor 120, memory 130, etc.) used to execute operations or functions of other programs (e.g., the middleware 143, API 145, and application programs 147). The kernel 141 provides an interface capable of allowing the middleware 143, API 145, and application programs 147 to access and control/manage the individual components of the electronic device 101.

The middleware 143 is capable of mediating between the API 145 or application programs 147 and the kernel 141 so that the API 145 or the application programs 147 can communicate with the kernel 141 and exchange data therewith. The middleware 143 is capable of processing one or more task requests received from the application programs 147 according to the priority. For example, the middleware 143 is capable of assigning a priority for use of system resources of the electronic device 101 (e.g., the bus 110, processor 120, memory 130, etc.) to at least one of the application programs 147. For example, the middleware 143 processes one or more task requests according to a priority assigned to at least one application program, thereby performing scheduling or load balancing for the task requests.

The API 145 refers to an interface configured to allow the application programs 147 to control functions provided by the kernel 141 or the middleware 143. The API 145 is capable of including at least one interface or function (e.g., instructions) for file control, window control, image process, text control, or the like.

The input/output interface 150 may include various input/output circuitry and is capable of transferring instructions or data, received from the user or external devices, to one or more components of the electronic device 101. The input/output interface 150 is capable of outputting instructions or data, received from one or more components of the electronic device 101, to the user or external devices.

The display 160 is capable of including a Liquid Crystal Display (LCD), a flexible display, a transparent display, a Light Emitting Diode (LED) display, an Organic Light Emitting Diode (OLED) display, Micro-Electro-Mechanical Systems (MEMS) display, an electronic paper display, or the like, but is not limited thereto. The display 160 is capable of displaying various types of content (e.g., texts, images, videos, icons, symbols, etc.). The display 160 may also be implemented with a touch screen. In this case, the display 160 is capable of receiving touches, gestures, proximity inputs or hovering inputs, via a stylus pen, or a user's body.

The communication interface 170 may include various communication circuitry and is capable of establishing communication between the electronic device 101 and an external device (e.g., a first external device 102, a second electronic device 104, or a server 106). For example, the communication interface 170 is capable of communicating with an external device (e.g., a second external device 104 or a server 106) connected to the network 162 via wired or wireless communication.

Wireless communication may employ, as cellular communication protocol, at least one of the following: long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communication (GSM). Wireless communication may also include short-range wireless communication 164. Short-range wireless communication 164 may include at least one of the following: wireless fidelity (WiFi), Bluetooth (BT), near field communication (NFC), Magnetic Secure Transmission (MST), and Global Navigation Satellite System (GNSS).

The MST may generate a pulse by transmission data using an electromagnetic signal, and the pulse may generate a magnetic field signal. The electronic device 101 may transmit the magnetic field signal to the POS terminal, which detects the magnetic field signal by means of the MST reader and converts the magnetic field signal to an electric signal to recover the data.

The GNSS may include at least one of the following: Global Positioning System (GPS), Global Navigation Satellite System (Glonass), Beidou Navigation Satellite System (hereinafter called 'Beidou"), Galileo, the European global satellite-based navigation system, according to GNSS using areas, bandwidths, etc. In the present disclosure, "GPS" and "GNSS" may be used interchangeably. Wired communication may include at least one of the following: universal serial bus (USB), high definition multimedia interface (HDMI), recommended standard 232 (RS-232), and plain old telephone service (POTS). The network 162 may include at least one of the following: a telecommunications network, e.g., a computer network (e.g., LAN or WAN), the Internet, and a telephone network.

The first and second external electronic devices 102 and 104 are each identical to or different from the electronic device 101, in terms of type. According to an embodiment, the server 106 is capable of including a group of one or more servers. According to various embodiments, part or all of the operations executed on the electronic device 101 may be executed on another electronic device or a plurality of other electronic devices (e.g., electronic devices 102 and 104 or a server 106). According to an embodiment, when the electronic device needs to perform a function or service automatically or according to a request, it does not perform the function or service, but is capable of additionally requesting at least part of the function related to the function or service from other electronic device (e.g., electronic devices 102 and 104 or a server 106). The other electronic device (e.g., electronic devices 102 and 104 or a server 106) is capable of executing the requested function or additional functions, and transmitting the result to the electronic device 101. The electronic device 101 processes the received result, or further proceeds with additional processes, to provide the requested function or service. To this end, the electronic device 101 may employ cloud computing, distributed computing, or client-server computing technology.

Figure 2:
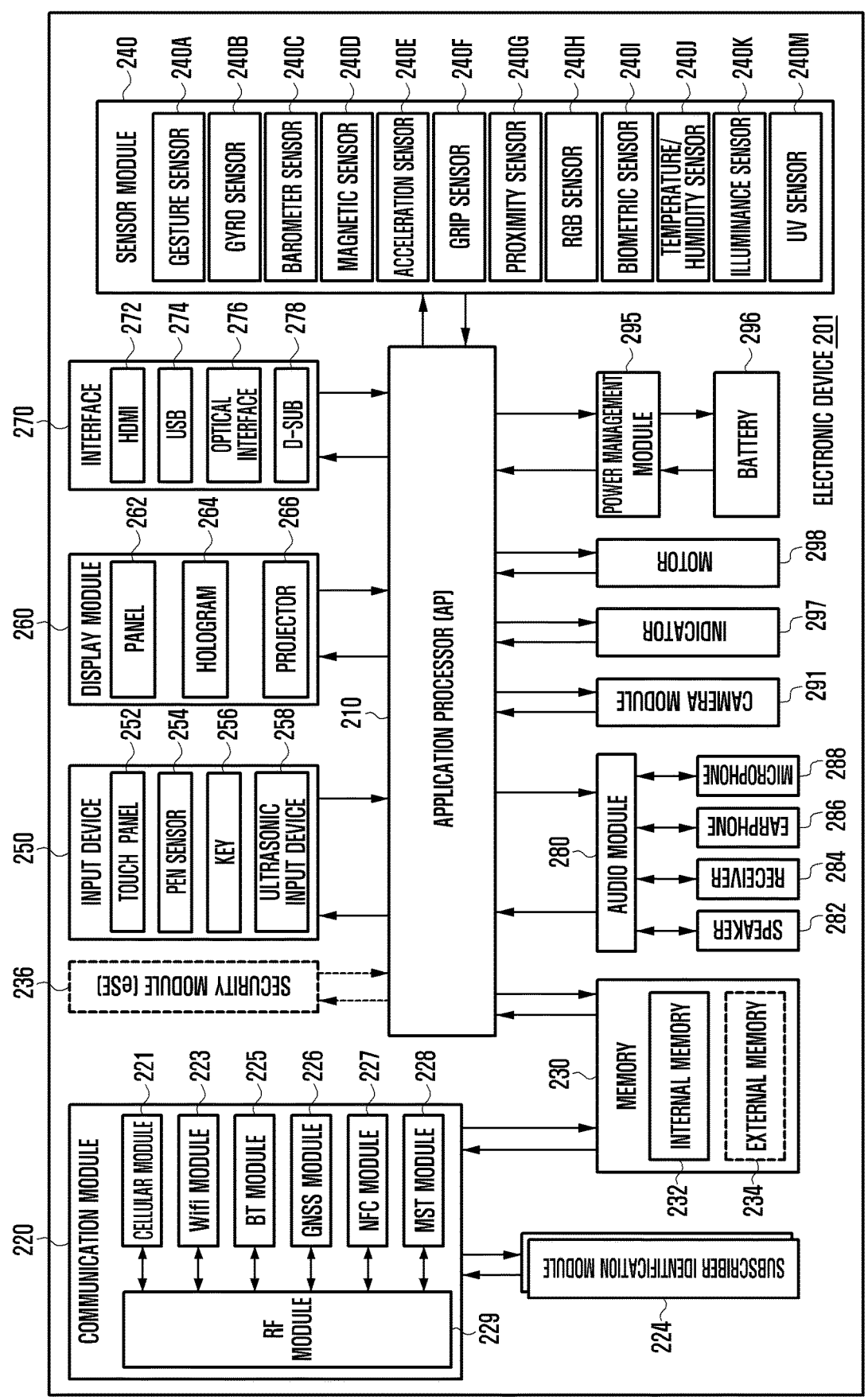
FIG. 2 is a block diagram illustrating an example electronic device according to various example embodiments of the present disclosure.

FIG. 2 is a block diagram illustrating an example electronic device 201 according to various example embodiments. For example, the electronic device 201 is capable of including part or all of the components in the electronic device 101 illustrated in FIG. 1. The electronic device 201 may include one or more processors (e.g., including processing circuitry) 210 (e.g., Application Processors (APs)), a communication module (e.g., including communication circuitry) 220, a Subscriber Identification Module (SIM) 224, a memory 230, a sensor module 240, a security module (e.g., including security circuitry) 236, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and is capable of driving, for example, an operating system or an application program to control a plurality of hardware or software components connected to the processor 210, processing various data, and performing operations. The processor 210 may be implemented as, for example, a System on Chip (SoC). According to an embodiment, the processor 210 may further include a graphic processing unit (GPU) and/or an image signal processor. The processor 210 may also include at least part of the components illustrated in FIG. 2, e.g., a cellular module 221. The processor 210 is capable of loading commands or data received from at least one of other components (e.g., a non-volatile memory) on a volatile memory, processing the loaded commands or data. The processor 210 is capable of storing various data in a non-volatile memory.

The communication module 220 may include the same or similar configurations as the communication interface 170 illustrated in FIG. 1. For example, the communication module 170 may include various communication circuitry, such as, for example, and without limitation, a cellular module 221, WiFi module 223, Bluetooth (BT) module 225, GNSS module 226 (e.g., a GPS module, Glonass module, Beidou module or Galileo module), NFC module 227, MST module 228 and Radio Frequency (RF) module 229.

The cellular module 221 is capable of providing a voice call, a video call, an SMS service, an Internet service, etc., through a communication network, for example. According to an embodiment, the cellular module 221 is capable of identifying and authenticating an electronic device 201 in a communication network by using a subscriber identification module (SIM) 224 (e.g., a SIM card). According to an embodiment, the cellular module 221 is capable of performing at least part of the functions provided by the processor 210. According to an embodiment, the cellular module 221 is also capable of including a communication processor (CP).

Each of the WiFi module 223, the BT module 225, the GNSS module 226, the NFC module 227, and MST module 228 is capable of including a processor for processing data transmitted or received through the corresponding module. According to embodiments, at least part of the cellular module 221, WiFi module 223, BT module 225, GNSS module 226, NFC module 228, and MST module 228 (e.g., two or more modules) may be included in one integrated chip (IC) or one IC package.

The RF module 229 is capable of transmission/reception of communication signals, e.g., RF signals. The RF module 229 is capable of including a transceiver, a power amp module (PAM), a frequency filter, a low noise amplifier (LNA), an antenna, etc. According to another embodiment, at least one of the following modules: cellular module 221, WiFi module 223, BT module 225, GNSS module 226, NFC module 228, and MST module 228 is capable of transmission/reception of RF signals through a separate RF module.

The SIM module 224 is capable of including a card including a subscriber identification module (SIM) and/or an embodied SIM. The SIM module 224 is also capable of containing unique identification information, e.g., integrated circuit card identifier (ICCID), or subscriber information, e.g., international mobile subscriber identity (IMSI).

The memory 230 (e.g., memory 130 shown in FIG. 1) is capable of including a built-in memory 232 and/or an external memory 234. The built-in memory 232 is capable of including at least one of the following: a volatile memory, e.g., a dynamic RAM (DRAM), a static RAM (SRAM), a synchronous dynamic RAM (SDRAM), etc.; and a non-volatile memory, e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, an NOR flash memory, etc.), a hard drive, a solid state drive (SSD), etc.

The external memory 234 is also capable of including a flash drive, e.g., a compact flash (CF), a secure digital (SD), a micro secure digital (Micro-SD), a mini secure digital (Mini-SD), an extreme digital (xD), a multi-media card (MMC), a memory stick, etc. The external memory 234 is capable of being connected to the electronic device 201, functionally and/or physically, through various interfaces.

According to various embodiments of the present disclosure, the security module 236 may include various security circuitry and has a storage space with a security level that is higher than that of the memory 230 and may be implemented as a circuit capable of guaranteeing safe data storage and a secure execution environment. For example, the electronic device may encrypt the data requiring high security (e.g., biometric information, personal information, and credit card information) and store the key for use in the security module 236. The security module 236 may be implemented as a separate circuit and may include a separate processor. The security module 236 may be provided in the form of a detachable smart chip or an embedded secure element (eSE) included in a Secure Digital (SD) card or a chip embedded in the electronic device. The security module 236 may be executed on an Operating System (OS) different from that of the electronic device. For example, it may operate on a Java Card Open Platform (JCOP).

The sensor module 240 is capable of measuring/detecting a physical quantity or an operation state of the electronic device 201, and converting the measured or detected information into an electronic signal. The sensor module 240 is capable of including at least one of the following: a gesture sensor 240A, a gyro sensor 240B, an atmospheric pressure (e.g., barometer) sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illuminance sensor 240K, and a ultraviolet (UV) sensor 240M. Additionally or alternatively, the sensor module 240 is capable of further including an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 is capable of further including a control circuit for controlling one or more sensors included therein. In embodiments, the electronic device 201 is capable of including a processor, configured as part of the processor 210 or a separate component, for controlling the sensor module 240. In this case, while the processor 210 is operating in sleep mode, the processor is capable of controlling the sensor module 240.

The input device 250 may include various input circuitry, such as, for example, and without limitation, a touch panel 252, a (digital) pen sensor 254, a key 256, or an ultrasonic input unit 258. The touch panel 252 may be implemented with at least one of the following: a capacitive touch system, a resistive touch system, an infrared touch system, and an ultrasonic touch system. The touch panel 252 may further include a control circuit. The touch panel 252 may also further include a tactile layer to provide a tactile response to the user.

The (digital) pen sensor 254 may be implemented with a part of the touch panel or with a separate recognition sheet. The key 256 may include a physical button, an optical key, or a keypad. The ultrasonic input unit 258 is capable of detecting ultrasonic waves, created in an input tool, through a microphone 288, and identifying data corresponding to the detected ultrasonic waves.

The display 260 (e.g., the display 160 shown in FIG. 1) is capable of including a panel 262, a hologram unit 264, or a projector 266. The panel 262 may include the same or similar configurations as the display 160 illustrated in FIG. 1. The panel 262 may be implemented to be flexible, transparent, or wearable. The panel 262 may also be incorporated into one module together with the touch panel 252. The hologram unit 264 is capable of showing a stereoscopic image in the air by using light interference. The projector 266 is capable of displaying an image by projecting light onto a screen. The screen may be located inside or outside of the electronic device 201. According to an embodiment, the display 260 may further include a control circuit for controlling the panel 262, the hologram unit 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included in the communication interface 170 shown in FIG. 1. Additionally or alternatively, the interface 270 is capable of including a mobile high-definition link (MHL) interface, a secure digital (SD) card/multimedia card (MMC) interface, or an infrared data association (IrDA) standard interface.

The audio module 280 is capable of providing bidirectional conversion between a sound and an electronic signal. At least part of the components in the audio module 280 may be included in the input/output interface 150 shown in FIG. 1. The audio module 280 is capable of processing sound information input or output through a speaker 282, a receiver 284, earphones 286, microphone 288, etc.

The camera module 291 refers to a device capable of taking both still and moving images. According to an embodiment, the camera module 291 is capable of including one or more image sensors (e.g., a front image sensor or a rear image sensor), a lens, an image signal processor (ISP), a flash (e.g., an LED or xenon lamp), etc.

The power management module 295 is capable of managing power of the electronic device 201. According to an embodiment, the power management module 295 is capable of including a power management integrated circuit (PMIC), a charger IC, or a battery or fuel gauge. The PMIC may employ wired charging and/or wireless charging methods. Examples of the wireless charging method are magnetic resonance charging, magnetic induction charging, and electromagnetic charging. To this end, the PMIC may further include an additional circuit for wireless charging, such as a coil loop, a resonance circuit, a rectifier, etc. The battery gauge is capable of measuring the residual capacity, charge in voltage, current, or temperature of the battery 296. The battery 296 takes the form of either a rechargeable battery or a solar battery.

The indicator 297 is capable of displaying a specific status of the electronic device 201 or a part thereof (e.g., the processor 210), e.g., a boot-up status, a message status, a charging status, etc. The motor 298 is capable of converting an electrical signal into mechanical vibrations, such as, a vibration effect, a haptic effect, etc. Although not shown, the electronic device 201 is capable of further including a processing unit (e.g., GPU) for supporting a mobile TV. The processing unit for supporting a mobile TV is capable of processing media data pursuant to standards, e.g., digital multimedia broadcasting (DMB), digital video broadcasting (DVB), or mediaFlo™, etc.

Figure 3:
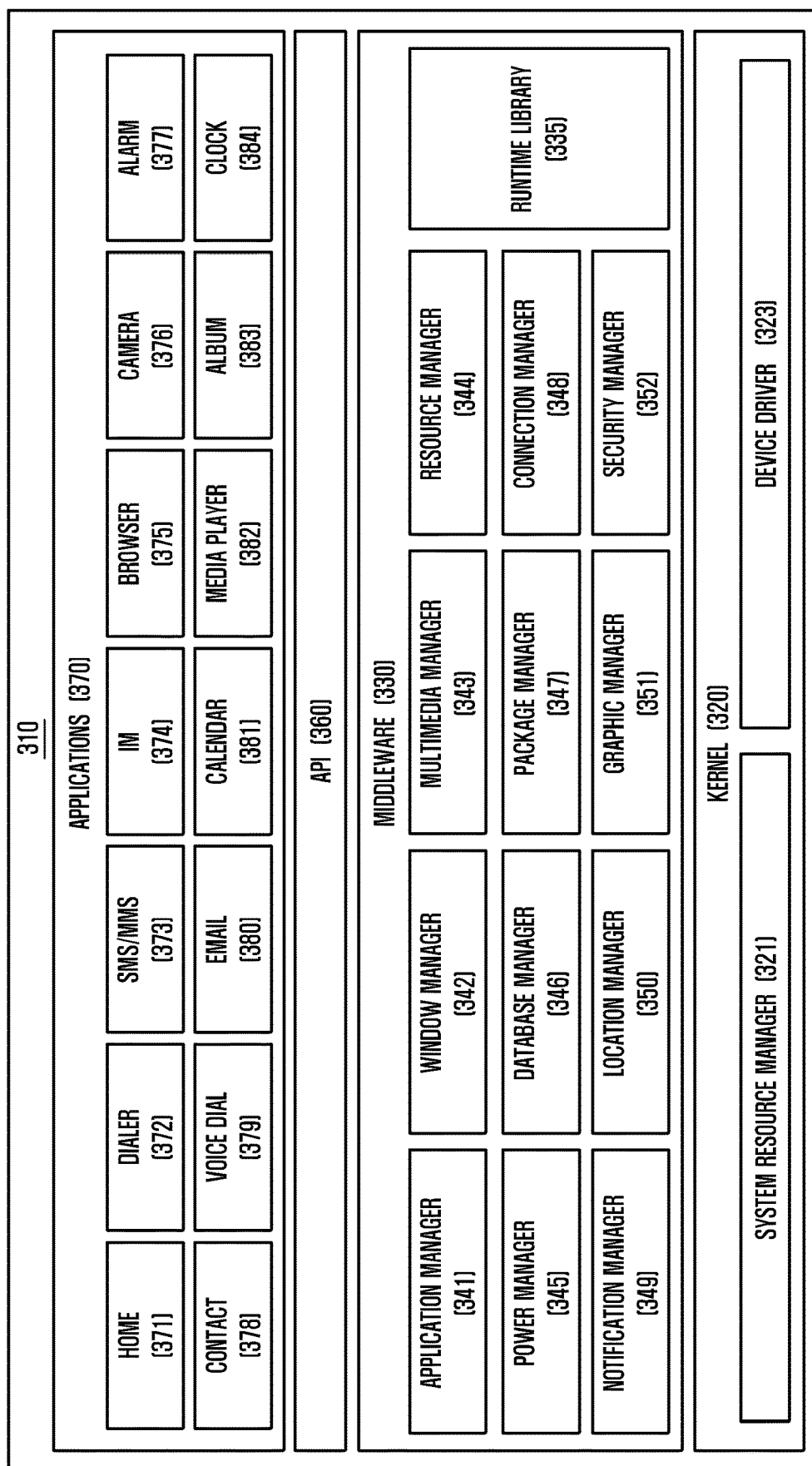
FIG. 3 is a block diagram illustrating an example program module according to various example embodiments of the present disclosure.

FIG. 3 is a block diagram illustrating an example programming module according to various embodiments. According to an embodiment, the program module 310 (e.g., program module 140 illustrated in FIG. 1) is capable of including an operation system (OS) for controlling resources related to the electronic device (e.g., electronic device 101) and/or various applications (e.g., application programs 147 illustrated in FIG. 1) running on the OS. The OS may be Android, iOS, Windows, Symbian, Tizen, Bada, etc.

The program module 310 may include a kernel 320, middleware 330, application programming interface (API) 360 and/or applications 370. At least part of the program module 310 may be preloaded on the electronic device or downloaded from a server (e.g., an electronic device 102 or 104, server 106, etc.).

The kernel 320 (for example, kernel 141) may include a system resource manager 321 and/or a device driver 323. The system resource manager 321 may include, for example, a process manager, a memory manager, and a file system manager. The system resource manager 321 may perform a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver.

The middleware 330 may provide a function required in common by the applications 370. Further, the middleware 330 may provide a function through the API 360 to allow the applications 370 to efficiently use limited system resources within the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include, for example, a library module used by a complier to add a new function through a programming language while the applications 370 are executed. According to an embodiment, the runtime library 335 executes input and output, management of a memory, a function associated with an arithmetic function and the like.

The application manager 341 may manage, for example, a life cycle of at least one of the applications 370. The window manager 342 may manage GUI resources used on the screen. The multimedia manager 343 may detect a format required for reproducing various media files and perform an encoding or a decoding of a media file by using a codec suitable for the corresponding format. The resource manager 344 manages resources such as a source code, a memory, or a storage space of at least one of the applications 370.

The power manager 345 may operate together with a Basic Input/Output System (BIOS) to manage a battery or power and provides power information required for the operation. The database manager 346 may manage generation, search, and change of a database to be used by at least one of the applications 370. The package manager 347 may manage an installation or an update of an application distributed in a form of a package file.

The connection manager 348 may manage, for example, a wireless connection such as WiFi or Bluetooth. The notification manager 349 may display or notify a user of an event such as an arrival message, an appointment, a proximity alarm or the like, in a manner that does not disturb the user. The location manager 350 may manage location information of the electronic device. The graphic manager 351 may manage a graphic effect provided to the user or a user interface related to the graphic effect. The security manager 352 provides a general security function required for a system security or a user authentication. According to an embodiment, when the electronic device (for example, the electronic device 101) has a call function, the middleware 330 may further include a telephony manager for managing a voice of the electronic device or a video call function.

The middleware 330 is capable of including modules configuring various combinations of functions of the above described components. The middleware 330 is capable of providing modules specialized according to types of operation systems to provide distinct functions. The middleware 330 may be adaptively configured in such a way as to remove part of the existing components or to include new components.

The API 360 (for example, API 145) may be a set of API programming functions, and may be provided with a different configuration according to an operating system. For example, in Android or iOS, a single API set may be provided for each platform. In Tizen, two or more API sets may be provided.

The applications 370 (e.g., application programs 147) may include one or more applications for performing various functions, e.g., home 371, dialer 372, SMS/MMS 373, instant message (IM) 374, browser 375, camera 376, alarm 377, contact 378, voice dial 379, email 380, calendar 381, media player 382, album 383, clock 384, and may include various other applications not shown in FIG. 3, such as, for example, and without limitation, health care (e.g., an application for measuring amount of exercise, blood sugar level, etc.), and environment information (e.g., an application for providing atmospheric pressure, humidity, temperature, etc.).

According to an embodiment, the applications 370 are capable of including an application for supporting information exchange between an electronic device (e.g., electronic device 101) and an external device (e.g., electronic devices 102 and 104), which is hereafter called 'information exchange application'). The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices (e.g., electronic devices 102 and 104). In addition, the notification relay application is capable of receiving notification information from external devices to provide the received information to the user.

The device management application is capable of managing (e.g., installing, removing or updating) at least one function of an external device (e.g., electronic devices 102 and 104) communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment, the applications 370 are capable of including an application (e.g., a health care application of a mobile medical device, etc.) specified attributes of an external device (e.g., electronic devices 102 and 104). According to an embodiment, the applications 370 are capable of including applications received from an external device (e.g., a server 106, electronic devices 102 and 104). According to an embodiment, the applications 370 are capable of including a preloaded application or third party applications that can be downloaded from a server. It should be understood that the components of the program module 310 may be called different names according to types of operating systems.

According to various embodiments, at least part of the program module 310 can be implemented with software, firmware, hardware, or any combination of two or more of them. At least part of the program module 310 can be implemented (e.g., executed) by a processor (e.g., processor 210). At least part of the programming module 310 may include modules, programs, routines, sets of instructions or processes, etc., in order to perform one or more functions.

The term "module" used in this disclosure may refer, for example, to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of a dedicated processor, a CPU, an ASIC (Application-Specific Integrated Circuit) chip, FPGAs (Field-Programmable Gate Arrays), and programmable-logic device, which have been known or are to be developed.

Figure 4:
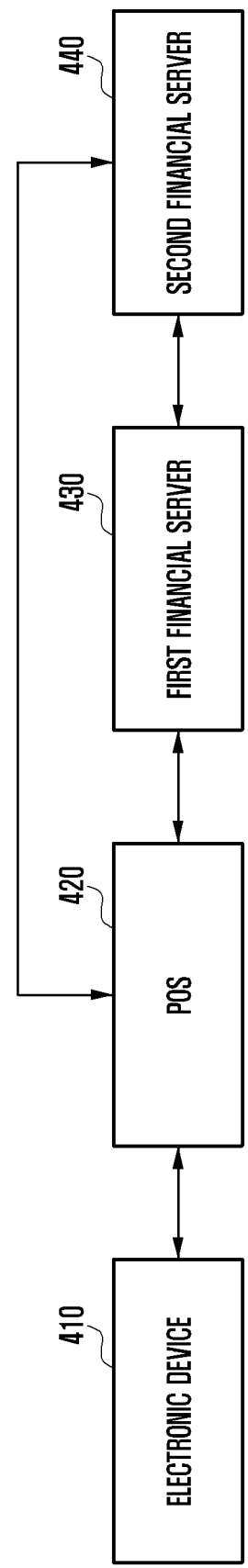
FIG. 4 is a diagram illustrating an example system for a payment operation of an electronic device according to various example embodiments of the present disclosure.

FIG. 4 is a diagram illustrating an example system for a payment operation of an electronic device according to various example embodiments of the present disclosure.

According to an embodiment of the present disclosure, the electronic device 410 may be equivalent to the electronic device 101 of FIG. 1 or the electronic device 201 of FIG. 2. According to an embodiment, the electronic device 410 may include at least one of the components of the electronic device 101 of FIG. 1 and the electronic device 201 of FIG. 2.

According to an embodiment of the present disclosure, the electronic device 410 may include a first communication module (e.g., short range communication module such as a Near Field Communication (NFC) module), and a second communication module (e.g., MST module).

According to various embodiments of the present disclosure, the electronic device 410 may transmit the first payment information (e.g., token and token cryptogram) to the POS terminal 420 by means of the NFC module. If an NFC signal is received from an external device (e.g., POS terminal 420), the electronic device 410 may transmit the first payment information to the external device. The POS terminal may be a terminal capable of short range communication to receive the magnetic field signal. For example, the POS terminal may be an electronic cash register, a tag reader, or a credit card reader.

According to various embodiments of the present disclosure, the electronic device 410 may transmit the second payment information (e.g., token and token cryptogram) to the POS terminal 420 by means of the MST module. For example, the electronic device 410 may transmit to the magnetic signal reader of the POS terminal 420 the payment information in a track data format. For example, the track data format may include an authentication code generated with a specific time (e.g., payment time and preconfigured time).

According to various embodiments of the present disclosure, the POS terminal 420 may forward the payment information received from the electronic device 410 to the first financial server 430.

According to various embodiments of the present disclosure, the first financial server 430 may perform authentication on the payment information received from the POS terminal 420. For example, the first financial server 430 may check time information or the authentication code created with the time information that is included in the second payment information. If the time associated with the checked authentication code is greater than a predetermined time, the first financial server 430 may transmit an authentication failure result value to the POS terminal 420 and/or the second financial server 440.

According to various embodiments of the present disclosure, the first financial server 430 may request to the second financial server 440 for authentication on the payment information.

According to various embodiments of the present disclosure, the second financial server 440 may transmit the payment information authentication result received from the first financial server 430 to the POS terminal 420. If the authentication fails, the POS terminal 420 may print out a transaction completion receipt or transmit authentication failure data to the electronic device 410, which displays a transaction failure message based on the received data.

Figure 5:
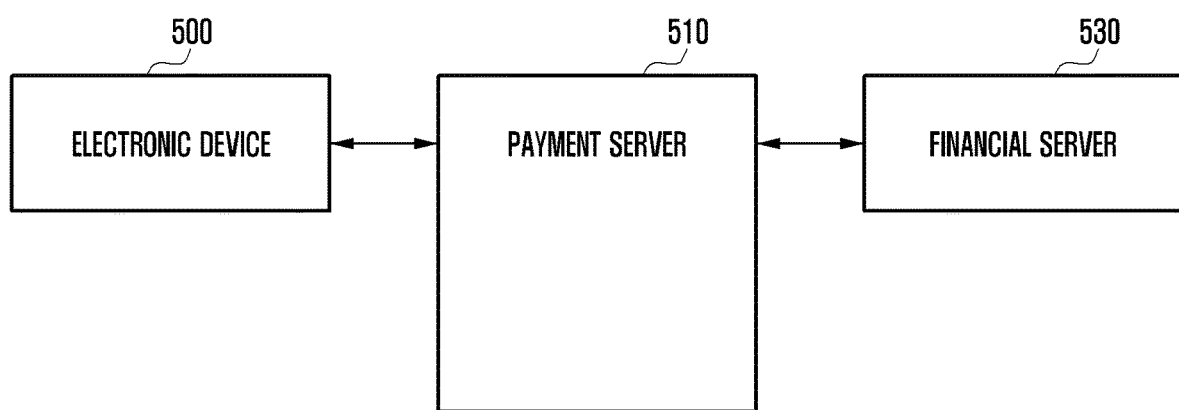
FIG. 5 is a diagram illustrating an example payment transaction system according to various example embodiments of the present disclosure.

FIG. 5 is a diagram illustrating an example payment transaction system according to various example embodiments of the present disclosure.

The payment transaction system of the present disclosure includes an electronic device 500, a payment server 510, and a financial server 530.

According to various embodiments of the present disclosure, the electronic device 500 may be equivalent of the electronic device 101 of FIG. 1 and the electronic device 201 of FIG. 2. According to an embodiment, the electronic device 500 may include at least one of the components of the electronic device 101 of FIG. 1 and the electronic device 201 of FIG. 2.

According to an embodiment of the present disclosure, the electronic device 500 may include a first communication module (e.g., short range communication module such as an NFC module) and a second communication module (e.g., MST module).

According to an embodiment of the present disclosure, the electronic device 500 may be provided with a payment application providing a payment-related user interface. For example, the electronic device 500 may store a payment application providing a wallet user interface, a credit card registration user interface, a payment user interface, and a transaction user interface. For example, the electronic device 500 may provide an Optical Character Reader/Recognition (OCR) or external input-based card registration user interface. For example, the electronic device 500 may store an identification and verification-based (ID&V-based) user authentication interface.

According to various embodiments of the present disclosure, the electronic device 500 may execute the payment application for performing a payment transaction. For example, the electronic device 500 may execute a Simple pay, a Quick pay, or a designated application to provide the user with a payment service. According to an embodiment of the present disclosure, the electronic device 500 may execute a payment function to provide the payment function-related information by means of the payment application.

According to various embodiments of the present disclosure, the electronic device 500 may store information on a credit card company. For example, the electronic device 500 may store a credit card company Software Development Kit (SDK).

According to various embodiments of the present disclosure, the payment server 510 may transmit/receive and process payment related information. According to an embodiment of the present disclosure, the payment server 510 may manage the information on the credit card associated with a service account or a user account. According to an embodiment of the present disclosure, the payment server 510 may include a module for managing user accounts.

According to various embodiments of the present disclosure, the payment server 510 may provide an interface for processing payment information. For example, the payment server 510 may issue, delete, or activate payment information. According to an embodiment, the payment server 510 may manage a token operation period including creation, modification, and deletion functions. According to an embodiment of the present disclosure, the payment server 510 may perform token provisioning, Identification and Verification (ID&V), replenishment, and Life Cycle management.

According to various embodiments of the present disclosure, the financial server 530 may issue a credit card. For example, the financial server 530 may belong to a card issuance bank. According to an embodiment, the financial server 530 may generate information for use by the user in payment. According to an embodiment, the financial server 530 may communicate payment-related information with the payment server 510.

Although the payment server 510 is depicted as a single block for convenience of explanation, it may include a plurality of servers that are responsible for separate functions such as token configuration, user identification, and token update. For example, it may be possible to implement a plurality of token service servers to share token data.

According to an embodiment of the present disclosure, the created payment information (e.g., token) may be stored in the security module.

Figure 6:
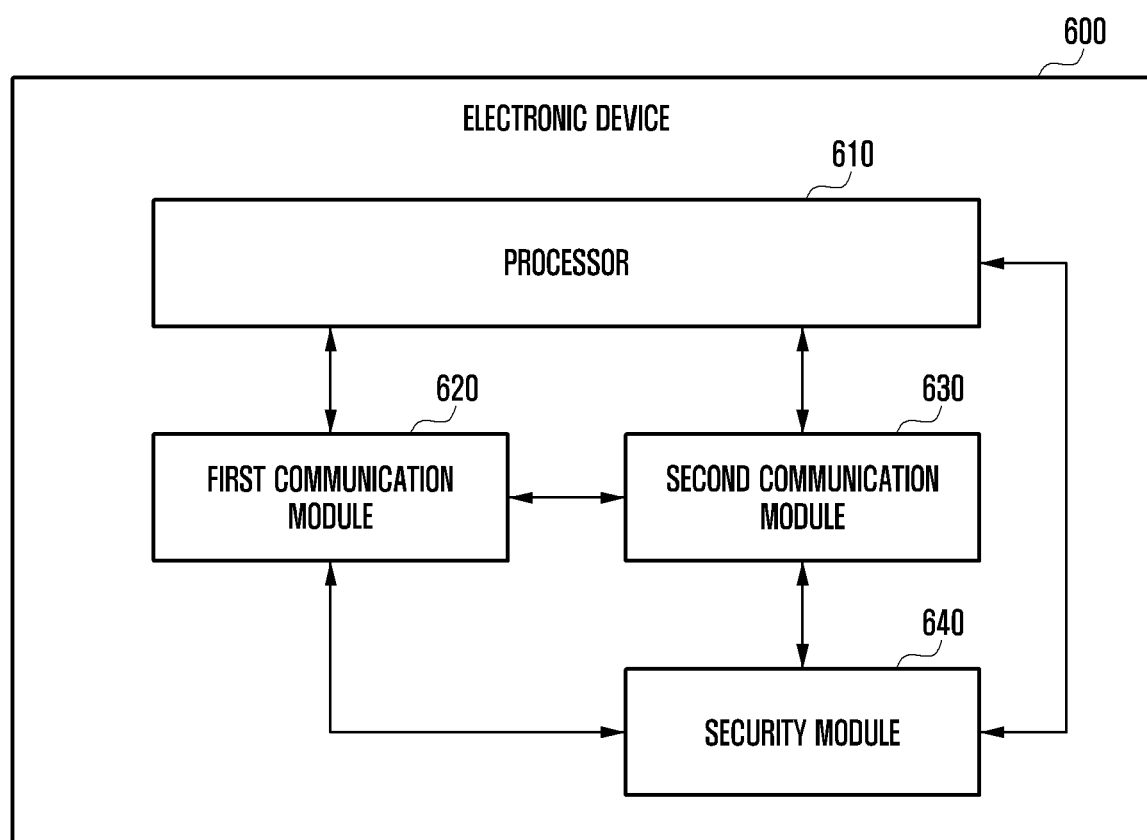
FIG. 6 is a block diagram illustrating an example electronic device according to various example embodiments of the present disclosure.

FIG. 6 is a block diagram illustrating an example electronic device according to various example embodiments of the present disclosure.

According to various embodiments of the present disclosure, the electronic device 600 may include a processor (e.g., including processing circuitry) 610, a first communication module (e.g., including first communication circuitry) 620, a second communication module (e.g., including second communication circuitry) 630, and a security module 640. According to an embodiment, the electronic device 600 may be equivalent to the electronic device 101 of FIG. 1 or the electronic device 201 of FIG. 2. According to an embodiment of the present disclosure, the electronic device 600 may include at least one (e.g., sensor module 240 and display module 260) of the components of the electronic device 101 of FIG. 1 and the electronic device 201 of FIG. 2.

According to various embodiments of the present disclosure, the processor 610 may be equivalent to the processor 120 of FIG. 1 or the application processor 210 of FIG. 2.

According to an embodiment of the present disclosure, the processor 610 may perform payment in a Trusted Execution Environment (TEE). The TEE is a secure environment capable of storing data with relatively high security levels and performing related operations. The TEE is located in the processor 610 of the electronic device 600 and operates based on a trusted hardware structure determined at the manufacturing state of the electronic device 600. Typically, when the processor 610 or memory (not shown) is split into a normal region and a security region, the TEE is located in the security region. The TEE may be configured such that a software or hardware component requiring security operates in the security region. According to an embodiment, the electronic device 600 may manage the TEE through physical hardware modification or logical software modification.

According to various embodiments of the present disclosure, the first and second communication modules 620 and 630 may be electrically connected to the processor 610.

According to an embodiment, the first and second communication modules 620 and 630 may be electrically connected to the security module 640.

According to various embodiments of the present disclosure, the electronic device 600 may include a processor 610, a first communication module 620 which may include various communication circuitry for transmitting/receiving the first payment information, a second communication module 630 which may include various communication circuitry for transmitting the second payment information, and a security module 640. The processor 610 may be functionally connected to the first and second communication modules 620 and 630. The first communication module 620 may be the short-range communication (NFC) module, and the second communication module 630 may be the MST module. For example, the first communication module 620 may include the NFC module 225 of FIG. 2, and the second communication module 630 may include the MST module 226 of FIG. 2.

According to various embodiments of the present disclosure, the security module 640 may be equivalent to the security module 236 of FIG. 2. The memory (not shown) is a module having a storage space with a relatively high security level and thus may be implemented as a circuit guaranteeing secure data storage and a protected execution environment. For example, the electronic device 600 may encrypt data requiring high security (e.g., biometric information, personal information, and credit card information) and store the key used in data encryption in the security module 640.

According to various embodiments of the present disclosure, the security module 640 may store transaction or authentication information. According to an embodiment, the security module 640 may transmit the transaction or authentication information to the first and second communication modules 620 and 630. For example, the security module 640 may store security-requiring information such as an account number, a token, and an encryption key. The account number may be credit card information such as a unique number of a credit card. The token may be used as the information in place of the unique number of the credit card. The account number and token may be used in an electronic payment, and the encryption key may be used for generating encryption data for payment authentication. The token and account number may be transmitted along with the encryption data.

According to various embodiments of the present disclosure, access to the payment information (e.g., first payment information and second payment information) by the processor 610 may be restricted. According to an embodiment, the payment information may be stored in the security module 640, to which at least one of the first and second communication modules 620 and 630 is allowed to access. For example, the security module 640 may store the first payment information corresponding to the first communication module 620 and the second payment information corresponding to the second communication module 630. In an example case that the electronic device 600 performs payment with the first payment information, the security module 640 may permit access of the processor 610 through the first communication module 620 and may not permit access through the second communication module 630. In another example case that the electronic device 600 performs payment with the second payment information, the security module 640 may permit access of the processor 610 through the second communication module 630 and may not permit access through the first communication module 620.

According to various embodiments of the present disclosure, the first payment information and the second payment information have different encrypted tokens for the same account information. For example, the encrypted token corresponding to the first payment information of a bank A account is "AAAA" while the encrypted token corresponding to the second payment information of the bank A account is "BBBB". The payment information may include a token containing at least one of the information on the account associated with the payment request and identity information (e.g., Integrated Circuit Card Identifier (ICCID) and International Mobile Subscriber Identity (IMSI)).

According to various embodiments of the present disclosure, the first communication module (e.g., NFC module) may operate in one of three communication modes: card emulation mode, reader/writer mode, and peer-to-peer (P2P) mode. In the card emulation mode, the authentication information stored in the security module 640 may be transmitted to an external reader. In the reader/writer mode, external tag information is acquired. The P2P mode supports data exchange between devices.

According to various embodiments of the present disclosure, the processor 610 may adjust the strength of the magnetic field signal transmitted from the second communication module 630 to the POS terminal and select, when there is a plurality of coil antennas, one of the coil antennas. The second communication module 630 may receive a pulse signal carrying the payment information transmitted by the processor 610 or the security module 640. According to an embodiment, the second communication module 630 may receive data in the magnetic stripe format with the token and payment information on one of track 1, 2, and 3 of a magnetic card. For example, track 1 carries bank account information, track 2 carries a credit card number, issuance date, and validity period, and track 3 carries affiliated company information.

According to various embodiments of the present disclosure, the processor 610 may receive a payment request signal. For example, the processor 610 may receive a user input for payment request or an NFC communication request signal.

According to various embodiments of the present disclosure, the processor 610 may select one of the first and second communication modules 620 and 630. According to various embodiments of the present disclosure, the processor 610 may be configured to transmit the payment information (e.g., first payment information and second payment information) corresponding to the selected communication module to an external device (e.g., POS terminal). For example, if the first communication module 620 is selected, the processor 610 may transmit the first payment information to the external device. If the second communication module 630 is selected, the processor 610 may transmit the second payment information to the external device.

According to various embodiments of the present disclosure, if the electronic device 600 approaches to within a predetermined distance of the external device (POS terminal), the processor 610 may select the first communication module (e.g., NFC module 620) upon receipt of the payment request signal from the external device. For example, if the electronic device 600 approaches or contacts the reader of the POS terminal, the first communication module 620 may receive an authentication information request from the POS terminal. According to an embodiment, the first communication module 620 may transmit the first payment information to the POS terminal.

According to various embodiments of the present disclosure, the processor 610 may select the second communication module (e.g., MST module 630) upon receipt of a user input. According to an embodiment, the second communication module 630 may transmit the second payment information to the POS terminal according to the transmission command from the processor 610. According to various embodiments, the second communication module 630 may be replaced with a module of outputting a barcode, a QR code, or audio data.

According to various embodiments of the present disclosure, if the second communication module 630 is selected, the security module 640 may transmit the second payment information to the second communication module 630 through the processor 610. For example, the payment information generated by the security module 640 may be security-reinforced through recombination, new encryption, or addition of security data in the TEE of the processor 610. The payment information added and modified by the processor 610 may be transmitted to the MST module.

According to various embodiments of the present disclosure, the security module 640 may transmit the second payment information to the second communication module 630 via the first communication module 620. For example, the security module 640 may transmit the payment information to the MST module via the NFC module for MST payment.

According to various embodiments of the present disclosure, the security module 640 may transmit the second payment information to the second communication module 630 directly for MST payment.

According to various embodiments of the present disclosure, if the payment request signal is received, the processor 610 may transmit a token request signal to a second external device (e.g., payment server). According to an embodiment, the processor 610 may receive a token from the second external device (e.g., token issuance server and payment server) in response to the token request signal.

According to various embodiments of the present disclosure, if the second communication module (e.g., MST module 630) is selected, the processor 610 may transmit the payment information stored in the security module 640 to the external device (e.g., POS terminal). According to an embodiment, the security module 640 may transmit token stored in the security module 640 to the second communication module 630. According to various embodiments, the token is digital data substituting for a credit card and received from a server of the credit card company when registering the credit card with the electronic device 600. The token may be received from the external device periodically for update and stored in the memory or the security module 640.

According to various embodiments of the present disclosure, the processor 610 may be configured to delete the payment information (e.g., to discard the token) when a payment completion signal is received from the external device.

According to various embodiments of the present disclosure, the processor 610 may receive biometric information and, if the received biometric information matches previously stored biometric information, transmit the payment information to the external device. According to an embodiment, the electronic device 600 may further include a sensor module (not shown).

According to an embodiment, the electronic device 600 may acquire biometric information of the user (e.g., fingerprint, iris, facial image, blood pressure, voice, and heart rate) by means of the sensor module (e.g., camera and fingerprint sensor).

According to various embodiments of the present disclosure, the electronic device 600 may perform an authentication process to acquire security data (e.g., token) from a secure memory (e.g., security module 640 and memory accessible in a secure environment) which is functionally connected to the electronic device 600 in attempting payment using the card information registered with the electronic device 600. According to an embodiment, the electronic device 600 may acquire biometric information (e.g., fingerprint and iris) of the user for user authentication.

According to various embodiments of the present disclosure, the electronic device 600 may perform payment using the credit card information and biometric information registered with the electronic device 600. According to an embodiment, if the biometric information authentication succeeds, the electronic device 600 can make a payment. According to an embodiment, if the biometric information authentication fails, the electronic device 600 cannot make a payment.

According to various embodiments of the present disclosure, if the credit card information does not match, the electronic device 600 may request for other biometric information. For example, the electronic device 600 may request for right iris information in association with the first card information and right thumb fingerprint information in association with the second card information.

According to various embodiments of the present disclosure, the electronic device 600 may include the first communication module 620 for transmitting/receiving the first payment information, the second communication module 630 for transmitting the second payment information, and the processor 610 which is functionally connected to the first and second communication modules.

According to an embodiment of the present disclosure, the first communication module 620 may be the short-range communication module (NFC module) and the second communication module 630 may be the MST module.

According to an embodiment of the present disclosure, the processor 610 may be configured to select one of the communication modules upon detection of a user input. The security module 640 may generate the payment information to the selected communication module. When the second communication module 630 is selected, the security module 640 may be configured to transmit the second payment information to the second communication module 630 via the processor 610 or via the first communication module 620 or directly.

The payment information may include the token containing at least one of the information on the account associated with the payment request and identity information.

According to various embodiments of the present disclosure, the processor 610 may be configured to transmit a token request signal to the second external device and receive the token from the second external device when a payment request signal is received.

The first payment information and the second payment information may have different encrypted tokens for the same account information.

According to an embodiment of the present disclosure, the processor 610 may be configured to delete the payment information upon receipt of a payment completion signal from the external device.

According to an embodiment, the processor 610 may be configured to receive biometric information and transmit the payment information to the external device when the received biometric information matches previously stored biometric information.

Figure 7:
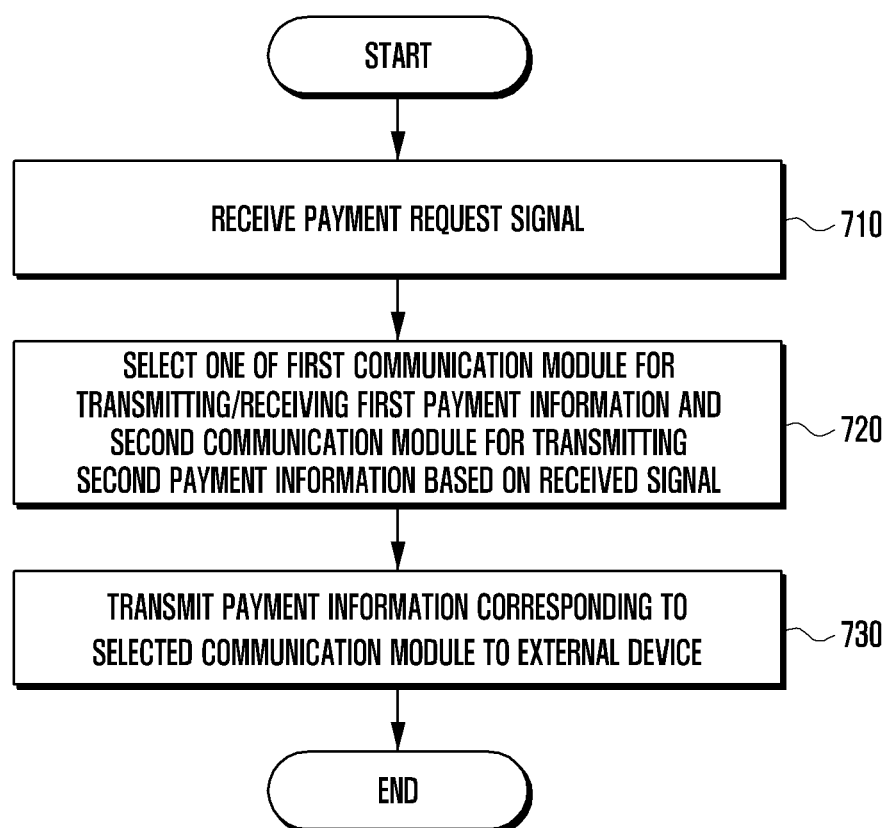
FIG. 7 is a flowchart illustrating an example payment method of an electronic device according to various example embodiments of the present disclosure.

FIG. 7 is a flowchart illustrating an example payment method of an electronic device according to various embodiments of the present disclosure.

The electronic device 600 may receive a payment request signal at step 710. For example, the electronic device 600 may receive a user input for payment request or detect an NFC signal while approaching an external device (e.g., POS terminal). According to an embodiment, the electronic device 600 may receive an activation signal from the external device (e.g., POS terminal).

The electronic device 600 may select one of the first communication module 620 for transmitting/receiving the first payment information and the second communication module 630 for transmitting the second payment information based on the received signal at step 720. The first communication module 620 may be the short-range communication module (NFC module), and the second communication module 630 may be the MST module.

According to an embodiment of the present disclosure, the payment information (e.g., first payment information and second payment information) may include a token containing at least one of the information on the account associated with the payment request and the identity information. According to an embodiment, the security module 640 may transmit the payment information to the selected communication module.

The token may be a value substituting for the Primary Account Number (PAN) as the credit card information. According to an embodiment, the token may be used for generating a Bank Identity Number (BIN). According to an embodiment, the token may be encrypted by an external server and decrypted by the electronic device 600. According to an embodiment, the first payment information and the second payment information may have different encrypted tokens for the same account information.

According to an embodiment of the present disclosure, the payment information may be stored in the security module 640, which limits access by the processor 610 of the electronic device 600 but allows access by one of the first and second communication modules 620 and 630.

According to an embodiment of the present disclosure, if the electronic device 600 approaches to within a predetermined distance of the external device to receive a payment request signal, it may select the first communication module 620. According to an embodiment, the electronic device 600 may select the second communication module 630 upon detection of a user input.

The electronic device 600 may transmit payment information corresponding to the selected communication module to the external device at step 730. According to an embodiment of the present disclosure, if the second communication module 630 is selected, the electronic device 600 may transmit the payment information stored in the security module 640 to the external device.

According to various embodiments of the present disclosure, if the second communication module 630 is selected, the security module 640 may transmit the second payment information to the second communication module 630 via the processor 610. According to an embodiment, the security module 640 may transmit the second payment information to the second communication module 630 via the first communication module 620. According to an embodiment, the security module 640 may transmit the second payment information to the second communication module 630 directly.

According to various embodiments of the present disclosure, if the payment request signal is received, the electronic device 600 may transmit a token request signal to a second external device (e.g., payment server and token issuance server). According to an embodiment, the electronic device 600 may receive the token from the second external device (e.g., payment server) in response to the token request signal.

According to various embodiments of the present disclosure, if a payment completion signal is received from the external device, the electronic device 600 may delete (or discard) the payment information. For example, if a payment accept signal is received from the external device (e.g., POS terminal), the electronic device 600 may discard the token used in the payment transaction.

According to various embodiments, the electronic device 600 may receive biometric information. According to an embodiment, if the received biometric information matches previously stored biometric information, the electronic device 600 may transmit the payment information to the external device.

According to various embodiments of the present disclosure, the payment transaction method of the electronic device 600 may include receiving a payment request signal, selecting one of the first communication module 620 for transmitting/receiving the first payment information and the second communication module 630 for transmitting the second payment information, and transmitting the payment information corresponding to the selected communication module to an external device. The first communication module 620 may be the short-range communication module (NFC module), and the second communication module 630 may be the MST module.

The communication module selection is made upon detection of a user input. The security module may generate the payment information to the selected communication module.

The payment transaction method of the electronic device 600 may further include transmitting, when the second communication module is selected, the second payment information generated by the security module to the second communication module via one of the processor and the first communication module or directly.

The payment information may include a token containing at least one of account information associated with the payment information and identity information. According to an embodiment, the payment transaction method of the electronic device 600 may further include transmitting, when the payment request signal is received, a token request signal and receiving the token from the second external device in response to the token request signal.

The first payment information and the second payment information may have different encrypted tokens for the same account information. According to an embodiment, the payment transaction method of the electronic device 600 may include deleting the payment information when a payment completion signal is received from the external device. The payment transaction method of the electronic device 600 may include receiving biometric information and transmitting, when the received biometric information matches previously stored biometric information, the payment information to the external device.

As described above, the payment transaction method and device of the present disclosure is capable of supporting mobile payment service based on various communication protocols. Also, the payment transaction method and apparatus of the present disclosure is capable of improving the security of a mobile payment environment using an enhanced security region.

At least part of the device (e.g., modules or functions thereof) or method (e.g., operations) according to various embodiments may be implemented as commands stored, e.g., in the form of program module, in a computer-readable storage medium. In case commands are executed by at least one processor, this processor may perform a particular function corresponding to the commands. The computer-readable storage medium may be, for example, the memory. At least some of the program module may be implemented (e.g., executed) by, for example, the processor. At least some of the program module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a compact disc read only memory (CD-ROM) and a digital versatile disc (DVD), magneto-optical media such as a floptical disk, and hardware devices specially configured to store and perform a program instruction. In addition, the program instructions may include high class language codes, which can be executed in a computer by using an interpreter, as well as machine codes made by a compiler. The aforementioned hardware device may be configured to operate as one or more software modules in order to perform the operation of various embodiments of this disclosure, and vice versa.

A module or programming module according to various embodiments may include or exclude at least one of the above-discussed elements or further include any other element. The operations performed by the module, programming module or any other element according to various embodiments may be executed sequentially, in parallel, repeatedly, or by a heuristic method. Additionally, some operations may be executed in different orders or omitted, or any other operation may be added.

While the present disclosure has been illustrated and described with reference to various example embodiments thereof, it will be understood by those skilled in the art that various changes in form and details may be made therein without departing from the spirit and scope of the disclosure as defined by the appended claims.

What is claimed is:

1. An electronic device, comprising:
   a first communication module comprising first communication circuitry configured to transmit and receive first payment information;
   a second communication module comprising second communication circuitry configured to transmit second payment information;
   a security module comprising circuitry; and
   a processor functionally connected to the security module, the first communication module and the second communication module,
   wherein the processor is configured to receive a payment request signal, to select at least one of the first communication module and second communication module based on the received payment request signal;
   wherein the security module is configured to: when the first communication module is selected by the processor, generate the first payment information for the first communication module to be transmitted to the first communication module; and when the second communication module is selected by the processor, generate the second payment information for the second communication module to be transmitted to the second communication module; and
   wherein the first communication circuitry is configured to transmit, to an external device, the first payment information when the first communication module is selected by the processor; and the second communication circuitry is configured to transmit, to the external device, the second payment information when the second communication module is selected by the processor.

2. The electronic device of claim 1, wherein the first communication module comprises a Near Field Communication (NFC) module including NFC circuitry, and the second communication module comprises a Magnetic Secure Transmission (MST) module including MST circuitry.

3. The electronic device of claim 1, wherein the processor is configured to select the communication module upon detection of an input.

4. The electronic device of claim 1, wherein:
   when the second communication module is selected by the processor, the second payment information is to be transmitted from the security module to the second communication module, and the processor is configured to receive the second payment information and reinforce security of the second payment information through recombination, new encryption, or addition of security data, and to cause transmission of the reinforced payment information to the second communication module.

5. The electronic device of claim 1, wherein the security module is configured to transmit, when the second communication module is selected, the second payment information to the second communication module via at least one of: the processor, the first communication module, or directly.

6. The electronic device of claim 1, wherein the first payment information and the second payment information each comprises a token including at least one of: account information associated with the payment request and identity information.

7. The electronic device of claim 1, wherein the processor is configured to transmit, when the payment request signal is received, a token request signal to a second external device and to receive a token from the second external device in response to the token request signal.

8. The electronic device of claim 1, wherein the first payment information and the second payment information comprise different encrypted tokens corresponding to same account information.

9. The electronic device of claim 1, wherein the processor is configured to delete the payment information when a payment completion signal is received from the external device.

10. The electronic device of claim 1, wherein the processor is configured to receive biometric information and to determine if the received biometric information matches previously stored biometric information, the electronic device is configured to transmit the first or second payment information to the external device when the received biometric information matches the previously stored biometric information.

11. A payment transaction method of an electronic device, the method comprising:
   receiving, by a processor of the electronic device, a payment request signal;

selecting, by the processor, at least one of a first communication module of the electronic device and a second communication module of the electronic device based on the received signal, the first communication module comprising first communication circuitry configured to transmit and receive first payment information and the second communication module comprising second communication circuitry configured to transmit second payment information;

when the first communication module is selected by the processor, generating, by a security module comprising circuitry the first payment information for the first communication module to be transmitted to an external device via the first communication module; and when the second communication module is selected by the processor, generating, by the security module, the second payment information for the second communication module to be transmitted to the external device via the second communication module.

12. The method of claim 11, wherein the first communication module comprises a Near Field Communication (NFC) module, and the second communication module comprises a Magnetic Secure Transmission (MST) module.

13. The method of claim 11, wherein selecting at least one of a first communication module and a second communication module comprises selecting the communication module upon detection of an input.

14. The method of claim 11, wherein when the second communication module is selected by the processor, the second payment information is transmitted from the security module to the external device, and the method further comprises reinforcing, by the processor, security of the second payment information through recombination, new encryption, or addition of security data, and wherein the second payment information transmitted to the external device includes the reinforced payment information.

15. The method of claim 11, comprising transmitting, when the second communication module is selected, the second payment information to the second communication module via at least one of: the processor, the first communication module, or directly.

16. The method of claim 11, wherein the first payment information and the second payment information each comprises a token including at least one of: account information associated with the payment request and identity information.

17. The method of claim 11, further comprising:
transmitting, when the payment request signal is received, a token request signal to a second external device; and
receiving a token from the second external device in response to receiving the token request signal.

18. The method of claim 11, wherein the first payment information and the second payment information comprise different encrypted tokens corresponding to same account information.

19. The method of claim 11, further comprising deleting, when a payment completion signal is received from the external device, the payment information.

20. The method of claim 11, further comprising:
receiving biometric information; and
wherein the first payment information or the second payment information is transmitted to the external device when the received biometric information matches previously stored biometric information.

* * * * *